United States Patent
Ioffe et al.

(10) Patent No.: US 7,464,183 B1
(45) Date of Patent: Dec. 9, 2008

(54) APPARATUS, SYSTEM, AND METHOD TO PREVENT ADDRESS RESOLUTION CACHE SPOOFING

(75) Inventors: Maksim Ioffe, San Francisco, CA (US); Thomas A. Maufer, Menlo Park, CA (US); Sameer Nanda, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 892 days.

(21) Appl. No.: 10/734,491

(22) Filed: Dec. 11, 2003

(51) Int. Cl.
*G06F 15/16* (2006.01)

(52) U.S. Cl. ...... 709/245; 709/217

(58) Field of Classification Search ........ 709/217, 709/245
See application file for complete search history.

(56) References Cited

U.S. PATENT DOCUMENTS

| | | | |
|---|---|---|---|
| 6,202,169 B1 * | 3/2001 | Razzaghe-Ashrafi et al. ... | 714/6 |
| 6,397,242 B1 * | 5/2002 | Devine et al. ........ | 718/1 |
| 6,574,618 B2 * | 6/2003 | Eylon et al. ........ | 707/1 |
| 6,681,225 B1 * | 1/2004 | Uceda-Sosa et al. ..... | 707/8 |
| 6,751,658 B1 * | 6/2004 | Haun et al. ........ | 709/222 |
| 6,771,649 B1 * | 8/2004 | Tripunitara et al. .... | 370/395.54 |
| 6,871,219 B2 * | 3/2005 | Noordergraaf et al. ...... | 709/214 |
| 7,039,049 B1 * | 5/2006 | Akgun et al. ........ | 370/389 |
| 7,089,300 B1 * | 8/2006 | Birse et al. ........ | 709/221 |
| 2002/0129115 A1 * | 9/2002 | Noordergraaf et al. ...... | 709/213 |

OTHER PUBLICATIONS

Plummer; "An Ethernet Address Resolution Protocol: or Converting Network Protocol Addresses to 48.bit Ehternet Address for Transmission on Ethernet Hardware;" *RFC 826*; Nov. 1998; pp. 1-9; http://www.faqs.org/rfc826.html.
Narten, et al. "Neighbor Discovery for IP Version 6 (IPv6);" *RFC 2461*; Dec. 1998; pp. 1-72; http://www.faqs.org/rfc2461.html.
Whalen; "An Introduction to Arp Spoofing;" Apr. 2001; 7 Pages.
On-Line Document; Teterin; Bugtrap: arp spoofing defence; Insecure.org; Nov. 14, 2002; pp. 1-2; http://seclists.org/lists/bugtrap/2002/Nov/0206.html.

* cited by examiner

*Primary Examiner*—Bunjob Jaroenchonwanit
*Assistant Examiner*—Brian P Whipple
(74) *Attorney, Agent, or Firm*—Cooley Godward Kronish LLP

(57) ABSTRACT

A firewall identifies unsolicited messages having an address resolution for a network protocol address different than cached address resolution information. The accuracy of the unsolicited messages is checked by requesting network elements to report address resolution information for the network protocol address.

14 Claims, 6 Drawing Sheets

APPARATUS, SYSTEM, AND METHOD TO PREVENT ADDRESS RESOLUTION CACHE SPOOFING

FIELD OF THE INVENTION

The present invention is generally related towards techniques to prevent spoofing of address resolution caches in computer systems.

BACKGROUND OF THE INVENTION

Individual computers of an Ethernet or other LAN network commonly have two addresses. The first address is an Internet Protocol (IP) address, which is a virtual network address assigned via a software source application. The IP address is used, for example, to form IP packets. However, each computer also has a physical address commonly known as the Medium Access Control (MAC) or also known as a hardware address. The MAC hardware source and destination addresses are necessary to prepare Ethernet headers to send data. Thus, in order for computers in an Ethernet network running IP to communicate, headers of individual frames require a source (sender) hardware address, and a destination (target) hardware address. This requires that a source computer station preparing to send a datagram to another station on the network know the correspondence between virtual IP addresses and physical hardware addresses.

There is a standard protocol known as the Address Resolution Protocol (ARP) that was initially designed to resolve Ethernet MAC addresses. Internet Request for Comments (RFC) 826 describes an ARP protocol for resolving Ethernet addresses, the contents of which are hereby incorporated by reference. RFC 826 describes a protocol to dynamically resolve correspondences between a network protocol address and a MAC address. ARP is not limited to operation on Ethernet; it is used to map IP addresses to MAC addresses on all types of broadcast-capable LAN networks. ARP includes a technique to request address resolution information, and a cache to temporarily save recently resolved MAC addresses.

Referring to prior art FIG. 1, an ARP cache 100 comprises a table of correspondences between IP addresses 110 and MAC addresses 120. A local ARP cache 100 is maintained by a computer to map protocol addresses to hardware addresses. Conventionally, each time a computer receives an address resolution response it automatically updates ARP cache 100 with the sender's protocol address and hardware address. ARP cache 100 commonly has a finite size and is periodically flushed to eliminate obsolete entries.

Referring to prior art FIG. 2, when a source application 205 in a computer station prepares a message having data 220 to be sent to a destination IP address 210 a lookup is performed by a MAC module 230 of the ARP cache 100 to determine a destination MAC address. If there is a cache hit for the destination MAC address 240, the destination MAC address is added to the frame that is sent out to the network.

However, if there is no cache entry in ARP cache 100 for the destination IP address, the source computer station broadcasts an ARP request message to the network. Referring to prior art FIG. 3, the ARP message format includes fields for a sender's hardware address, sender's protocol address, target hardware address, target protocol address, hardware address type, protocol address type, hardware address length, protocol address length, and operation.

The broadcast ARP request message includes a source IP address, a source MAC address, and a target IP address. The broadcast ARP request message is a request for the computer that has the target IP address to respond back with its MAC address. The source computer then waits for a reply. The target station sends a unicast ARP reply to the source computer station with its IP address and its MAC address. The ARP cache 100 is updated and the source computer is now able to send a frame to the target.

However, there is a significant security issue associated with ARP. It is possible for ARP replies to be spoofed. Spoofing is a form of security breach in which a hacker masquerades as another user. In the context of LAN networks, spoofing includes inserting forged frames into the data stream. In ARP spoofing, a malicious entity creates forged ARP replies to corrupt the ARP cache with forged MAC addresses.

In one version of ARP spoofing, an ARP spoofer sends an unsolicited ARP reply with a spoofed MAC address for the IP address of a target computer. The recipient computer automatically updates its ARP cache 100 being updated with the spoofed MAC address. When the recipient computer tries to send data to the target computer, it ends up using the spoofed MAC address provided by the spoofer. This permits the spoofer to intercept communications intended for the MAC address of the target computer. Additionally, ARP spoofing may be used to poison an ARP cache with erroneous MAC addresses so that data is lost.

ARP spoofing may also be used to initiate so-called "man in the middle" attacks, in which the spoofer creates spoofed MAC addresses in the ARP caches of a source computer and a destination computer which places the spoofer's computer in the middle of data flow between a source and target. Thus, if computer "A" wishes to send data to computer "B", a spoofer operating out of a computer "C" may place themself in the middle by creating a first spoofed MAC address in the ARP cache of computer A that fools computer A into sending data meant for computer B to computer C, and by creating a second spoofed MAC address in the ARP cache of computer B that fools computer B into sending data meant for computer A to computer C.

Other types of address resolution caches that are used to store an address resolution from a network protocol address to another type of address required to deliver data may be subject to similar types of spoofing. For example, IP Version 6 (IPv6) includes a neighbor discovery protocol. Address resolution in IPv6 is described in RFC 2461, the contents of which are hereby incorporated by reference. Address resolution in IPv6 includes the sending of multicast Neighbor Solicitation messages that include an IPv6 address of a target. A node having the IPv6 address responds with a Neighbor Advertisement indicating its IPv6 address and its link-layer address, where a link layer address is a link-layer identifier of an interface (e.g., IEEE 802 addresses for Ethernet and other LAN networks and E.164 addresses for ISDN networks). Additionally, a node may send an unsolicited Neighbor Advertisement to announce a link-layer address change.

In IPv6, a resolved link-layer address becomes an entry in a neighbor cache in the node. The link layer address resolution in IPv6 is thus analogous to ARP and the neighbor cache is analogous to the ARP cache. Consequently, the neighbor cache of IPv6 is potentially subject to analogous types of spoofing attacks in which a spoofer sends forged unsolicited Neighbor Advertisement messages with spoofed link-layer addresses.

Therefore, an improved apparatus, system, and method to prevent spoofing of an address resolution cache is desired.

SUMMARY OF THE INVENTION

An apparatus, system, method, and computer program product is disclosed for a firewall to prevent spoofing of an address resolution cache. An unsolicited message received from a network that provides an address resolution for a network protocol address may provide either a genuine address resolution or be a spoofed message. In one embodiment, an unsolicited message that submits a first address resolution for a network protocol address is identified as a suspicious message if cached address resolution information has a second address resolution that differs from the first address resolution. Upon receiving a suspicious message, the accuracy of the first address resolution is checked. A request is issued for a network element having the specified network protocol address to reply with address resolution information. The suspicious message is determined to be a spoofed message if a reply is received that confirms that a network element claiming to own the specified network protocol address still has the first address resolution.

In one embodiment the firewall maintains a shadow copy of the address resolution cache that it uses to check cached address resolution information. In this embodiment, the firewall maintains the shadow copy of the address resolution cache and checks the shadow copy for address resolution information to determine if previously cached address resolution differs from a new address resolution. In some embodiments, the shadow copy has a greater residency lifetime than the original address resolution cache.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
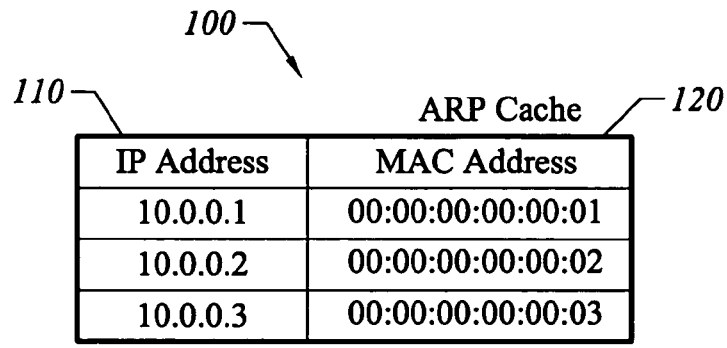
FIG. 1 illustrates a prior art Address Resolution Protocol (ARP) cache.
Figure 2:
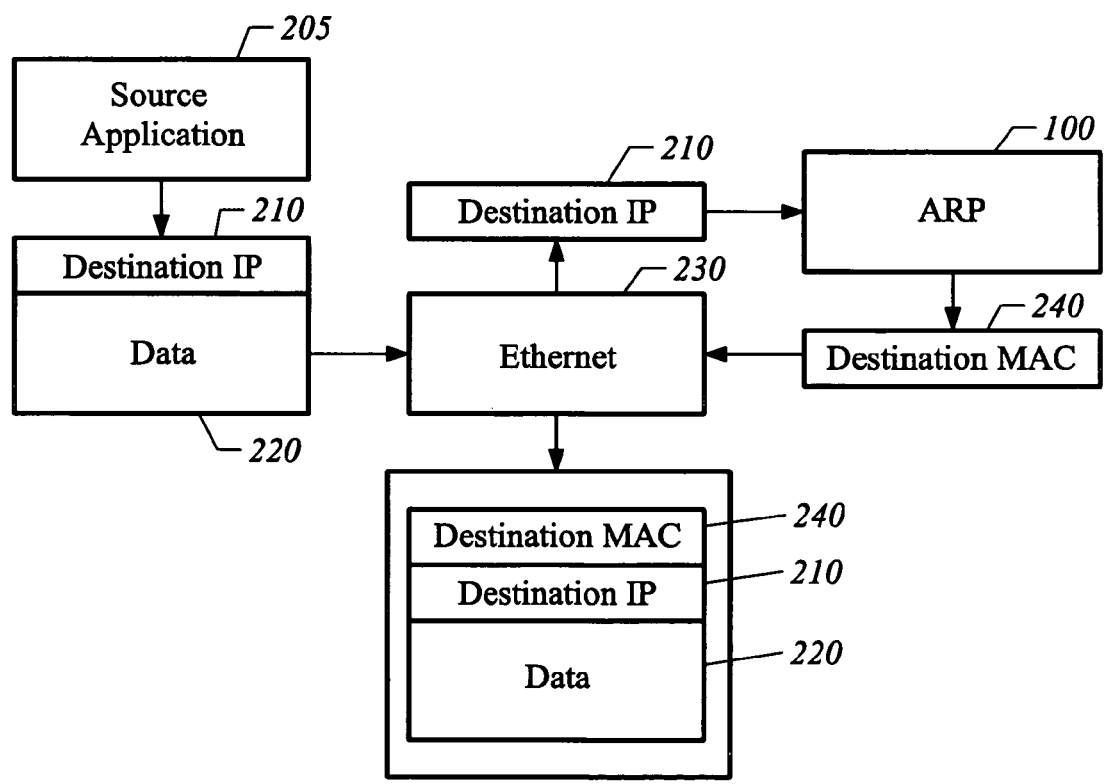
FIG. 2 is a block diagram illustrating a prior art system for address resolution.
Figure 3:
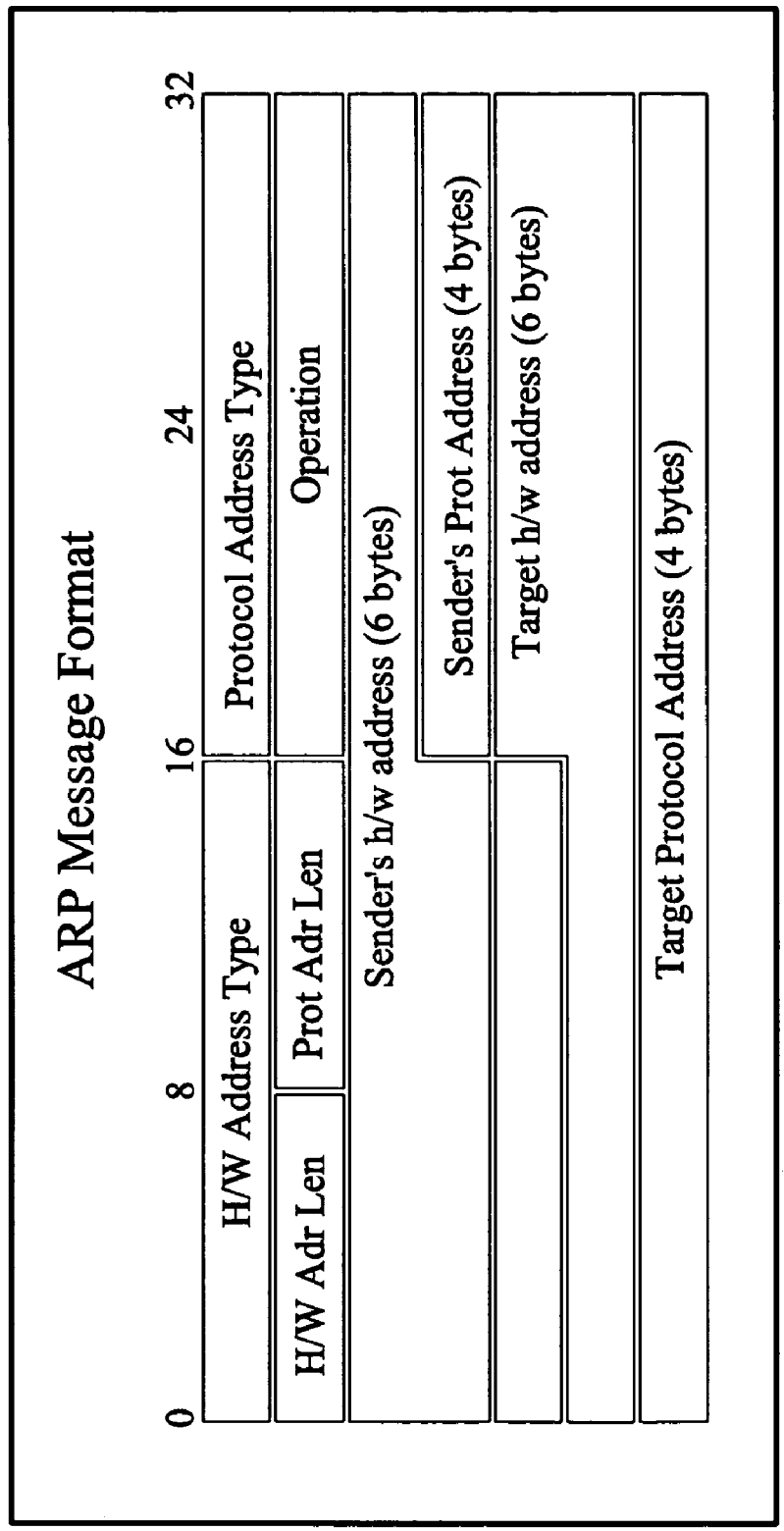
FIG. 3 illustrates a prior art ARP message format.
Figure 4:
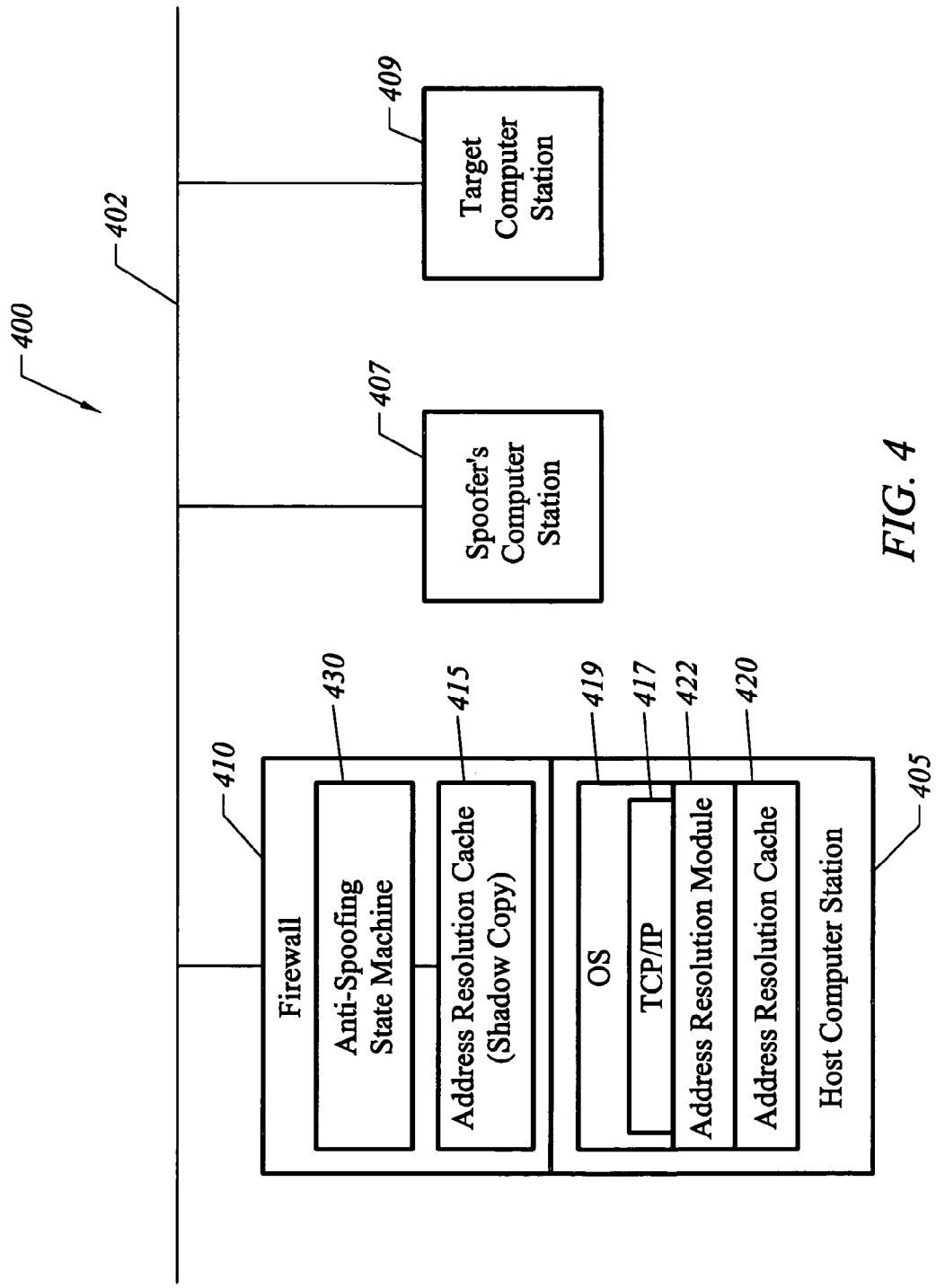
FIG. 4 is a block diagram of a system in accordance with one embodiment of the present invention.

FIG. 4 illustrates a network 400 in accordance with one embodiment of the present invention. A host computer station 405 is coupled to network 400 through a firewall 410. Network 400 includes at least one other computer station 409. In one embodiment, network 400 is a local area network (LAN). In one embodiment, each computer station 405 and 409 corresponds to an individual computer, such as a personal computer. However, it will be understood that an individual computer station 405 and 409 may correspond to a network element and that an individual network element may include a switch, router, server or other component for connecting network 400 to another network (not shown). Network 400 may also include one or more buses 402, switches, routers, or other network elements to couple data between the computer stations.

Host computer station 405 includes an address resolution cache 420. In one embodiment, address resolution cache 420 stores <network protocol address, data link layer address> pairs, where the network protocol address is a virtual address assigned by software and the data link layer address is an address required to deliver data to another network element. In one embodiment, address resolution cache 420 is a table associating network protocol addresses (e.g., IPv4 or IPv6 addresses) to data link layer addresses. Thus, each network protocol address in the cache has a corresponding data link layer address which is an address resolution for the network protocol address.

An address resolution module 417 uses the information in address resolution cache 420 in a lookup to determine a data link layer address for a network protocol address when it sends data to another computer station of network 400. For example, in an Address Resolution Protocol (ARP) embodiment, address resolution cache 420 may comprise an ARP cache having a table of IPv4 addresses and corresponding MAC addresses (i.e., <network protocol address, MAC address> pairs). For an IPv6 embodiment, address resolution cache 420 may be a neighbor discovery cache comprising a table of IPv6 addresses and corresponding MAC addresses. Address resolution cache 420 may be stored in a random access memory (RAM) or main memory of computer station 405.

Firewall 410 executes a protocol to prevent spoofing of address resolution cache 420 from a spoofer's computer station 407 that is directly or indirectly coupled to network 400. In one embodiment, an anti-spoofing state machine 430 within firewall 410 executes a protocol for identifying and preventing spoofing attacks directed at address resolution cache 420. As described below in more detail, firewall 410 examines cached address resolution information to identify suspicious address resolution messages that might be spoofed and then requests network elements to report address resolution information in order to determine whether the suspicious message is a real address resolution message or a spoofed address resolution message.

In one embodiment, firewall 410 includes a shadow copy 415 of an address resolution cache 420 of computer station 405 that it checks to identify messages that may originate from a spoofer. Shadow copy 415 includes the same type of address resolution stored in address resolution cache 420. However, since a conventional address resolution cache 420 commonly has a short cache residency lifetime before cache entries are evicted, in some embodiments of the present invention shadow copy 415 has an increased data size and residency lifetime compared to a conventional address resolution cache in order to improve the efficiency of firewall 410 at detecting spoofing attacks. However, throughout the following discussion it will be understood that in an alternate embodiment firewall 410 checks a conventional address resolution cache 420 that is modified to have an extended cache residency lifetime.

In one embodiment, firewall 410 comprises computer program instructions stored on a machine readable medium. For example, firewall 410 may comprise computer program instructions stored on a machine readable medium executable on computer station 405 or as computer program instructions stored on a machine readable medium which is executed on an intermediate hardware device disposed between computer station 405 and network 400. In an alternate embodiment, firewall 410 is disposed within a TCP/IP stack 417 associated with an operating system 419 of host computer station 405. Additionally, firewall 410 may be implemented on an intermediate device coupling host computer station 405 to network 400. It will thus be understood that firewall 410 may comprise a computer program product, be bundled with other computer software 419, be contained as part of a host computer station 405, or be contained within a hardware device coupling host computer station 405 to network 400. In one embodiment, firewall 410 is disposed on a Southbridge chipset, such as the nForce™ Media and Communications Processor (MCP) chipset manufactured by the Nvidia Corporation of Santa Clara, Calif.

Network 400 is a network in which MAC addresses are resolved by a protocol in which a computer station issues a request to resolve an address for a target network protocol address and a target computer station replies with address resolution information to update an address resolution cache 420. Additionally, the network protocol provides for a computer to send an unsolicited reply to a computer station that includes address resolution information. In one embodiment, network 400 is a LAN network running IPv4 and address resolution cache 120 is an Address Resolution Protocol (ARP) cache. However, it will be understood throughout the following discussion that embodiments of the present invention may include other types of network protocols, such as Neighbor Discovery in the context of IPv6.

Figure 5:
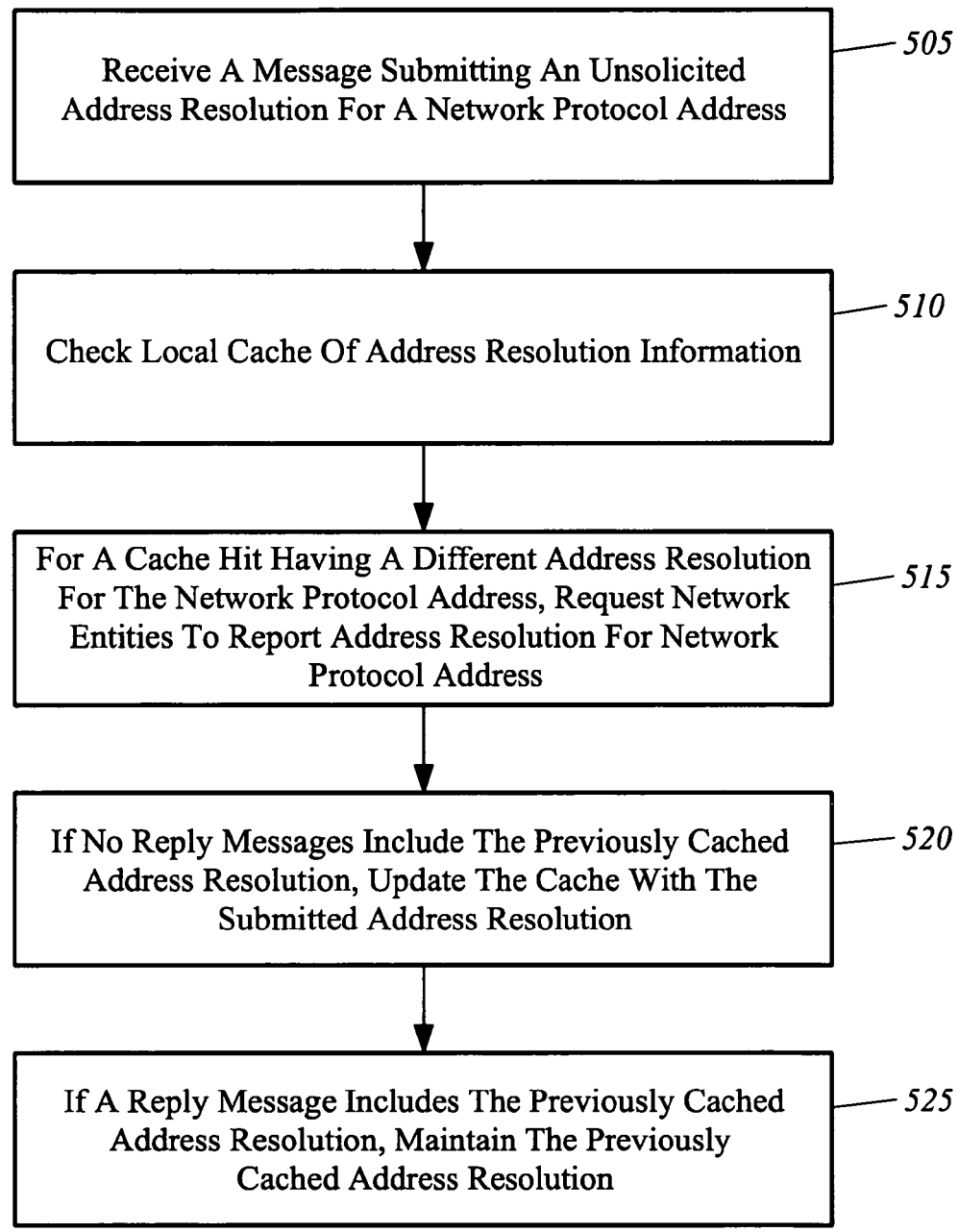
FIG. 5 is a flow chart of a method in accordance with one embodiment of the present invention.

FIG. 5 is a flow chart illustrating one embodiment of a method of preventing spoofing of an address resolution cache. Firewall 410 receives a message 505 submitting an unsolicited address resolution for a network protocol address (e.g., in an ARP embodiment an unsolicited ARP reply that includes the sender's IP address and MAC address). The message could be a genuine message sent by another (target) computer station 409 or a spoofed message sent by a spoofer's computer station 407. Consequently, firewall 410 checks cached addressed resolution information 510. In one embodiment firewall 410 checks the shadow copy 415 of address resolution information. (In an alternate embodiment, as previously discussed, if address resolution cache 420 has a sufficient residency lifetime, firewall 410 may check address resolution cache 420.)

If there is already a cache entry (a cache hit) having a different address resolution (e.g., a different MAC address in an ARP embodiment), firewall 410 requests 515 network elements (e.g., other computer stations) to report if they have an address resolution for the submitted network protocol address in order to check the accuracy/authenticity of the unsolicited new address resolution. In an ARP embodiment, this corresponds to sending a broadcast ARP request message. The computer station then waits a sufficient length of time to receive reply messages from other stations. If no reply message is received that matches the previously cached address resolution, firewall 410 determines that no attempt at spoofing has occurred and the address resolution cache 420 is updated 520 with the submitted address resolution. However, if a reply message includes the previously cached (old) address resolution, firewall 410 determines that an attempt at spoofing has occurred, and the previously cached address resolution is maintained 525 such that the cache is not updated with the submitted address resolution.

Figure 6:
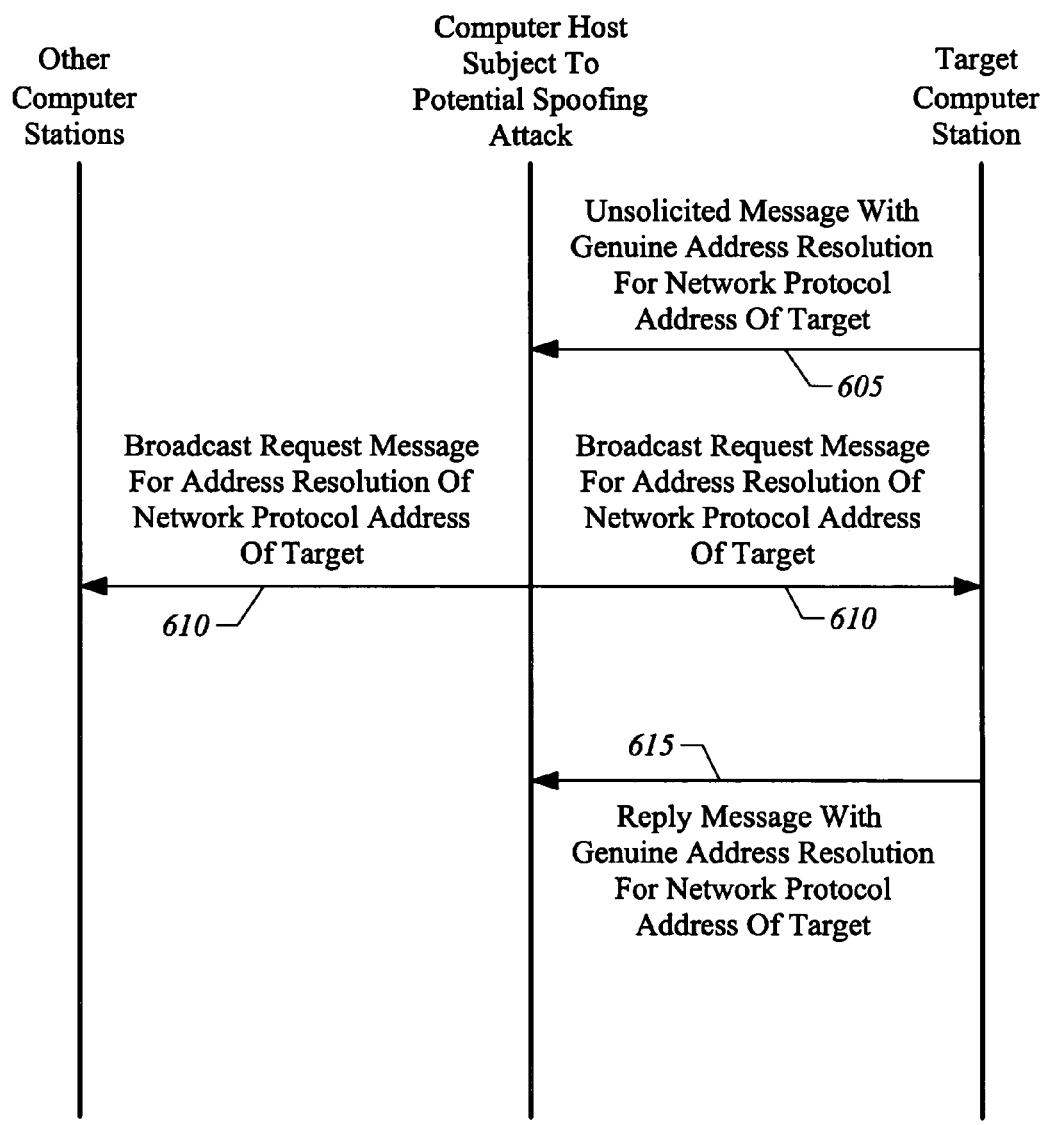
FIG. 6 is an interaction diagram showing a sequence of interactions for a normal address resolution update in accordance with one embodiment of the present invention.

FIG. 6 is an interaction diagram illustrating in more detail the situation where there is no attempt at spoofing and address resolution cache 420 is updated. An unsolicited address resolution message 605 is received from a target that has a genuine address resolution. The genuine address resolution may differ from a previously cached address resolution for the IP address of the target. For example, in an ARP embodiment, a hardware upgrade may change the MAC address of the target computer station such that the target computer sends an unsolicited ARP reply to inform other network elements of its new MAC address. In the example of FIG. 6, the firewall detects that the cached address resolution differs from the submitted address resolution. Since this is indicative of a suspicious message, the firewall acts to send a message 610 to network elements (e.g., other computer stations) for address resolution information for the network protocol address (e.g., an ARP broadcast message in an ARP embodiment). However, since in the example of FIG. 6 no spoofing has occurred, only the target computer station (which is, in this case, apparently in sole possession of the target IP address) will respond with a reply message 615 that repeats the submitted address resolution for the target IP address. Consequently, since there is no contradiction between the reply message 615 and the submitted address resolution of the unsolicited address resolution message 605, the firewall may determine that the message is not spoofed and permit the submitted address resolution to be used to update the address resolution cache 420. Firewall 410 may, for example, permit address resolution cache 420 to be updated by permitting the genuine unsolicited message 605 or reply 615 to pass on to computer station 405.

Figure 7:
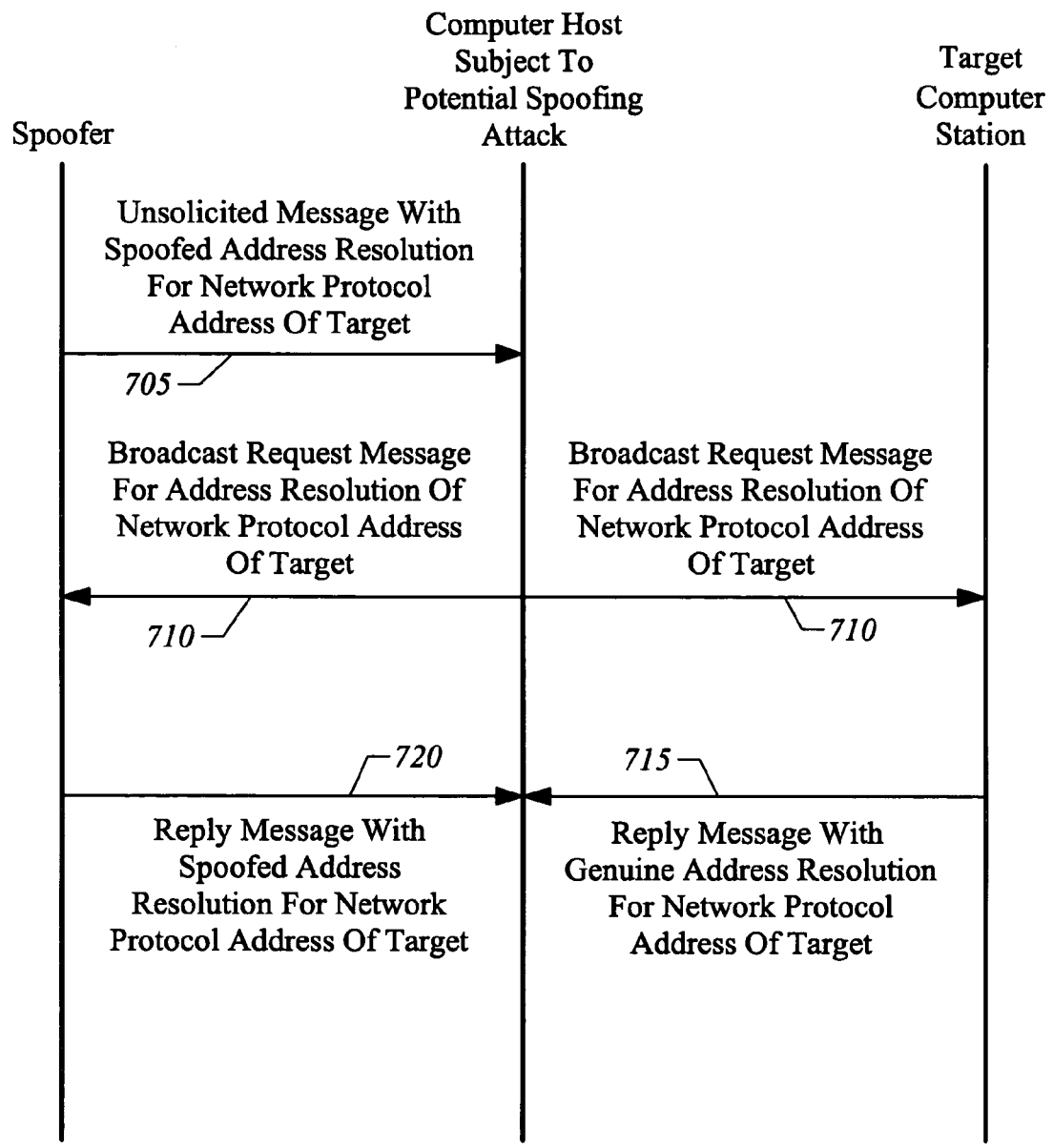
FIG. 7 is an interaction diagram showing a sequence of interactions for an attempted spoofing of an address resolution cache in accordance with one embodiment of the present invention.

FIG. 7 is an interaction diagram illustrating in more detail the situation where spoofing is attempted. An unsolicited message 705 is received from a spoofer that has a spoofed address resolution for the network protocol address of a target computer station. The firewall checks for cached address resolution information. Since this example depicts an attempt at spoofing, the previous cache entry for the network protocol address contains the original address resolution for the target computer (e.g., the MAC address for the network protocol address of the target computer station). Consequently, the firewall determines that this is a suspicious message and issues a request message 710 to other network elements requesting address resolution information for the network protocol address to verify that the submitted address resolution is genuine. For this case, the target computer will reply 715 with the genuine address resolution, which is the previously cached entry. (Note that a spoofer will also typically reply 720 as well to such a broadcast message, repeating the spoofed address resolution).

In the example of FIG. 7, the firewall can determine that an attempt at spoofing has occurred because the target computer issues a reply 715 that validates the original cache entry (and which disagrees with the spoofer's forged reply messages 705 and 720). As a result, firewall 410 prevents the address resolution cache from being updated. The firewall 410 may block updating of the cache in a variety of ways, such as by blocking passage of replies 705 and 720 or by generating a signal to block updating address resolution cache 420.

In some embodiments of the present invention, firewall 410 also generates a report of spoofing attacks. The report may be stored on computer station 405 or sent to a system administrator.

One benefit of the present invention is that only a single computer station 405 needs a firewall 410 of the present invention to prevent address resolution spoofing of the computer station. Another benefit of the present invention is that it is compatible with widely used address resolution techniques, such as ARP, and does not require special hardware to be installed at each computer station of a network.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of using a firewall resident on a host computer to prevent spoofing of an address resolution cache of said host computer, the method comprising:

said firewall receiving a first unsolicited message from a target computer station that submits a genuine address resolution for a network protocol address;

said firewall checking independently cached address resolution information associated with said host computer;

in response to determining that cached address resolution information for said network protocol address of said target computer station has a previously cached address resolution which differs from said genuine address resolution submitted by said first unsolicited message, said firewall issuing a first broadcast request for network elements having said network protocol address to reply with address resolution information in order to check the authenticity of said first unsolicited message submitting said genuine address resolution for said network protocol address;

in response to determining that no reply messages match said previously cached address resolution that would contradict said genuine address resolution in said first unsolicited message, said firewall determining that said first unsolicited message is not spoofed and permitting at least one message to pass onto said host computer which includes said genuine address resolution for said target computer station;

said firewall receiving a second unsolicited message from a spoofer that submits a spoofed address resolution for said network protocol address of said target computer station;

said firewall checking said independently cached address resolution information associated with said host computer;

in response to determining that said previously cached address resolution information for said network protocol address differs from said spoofed address resolution submitted by said second unsolicited message, said firewall issuing a second broadcast request for network elements having said network protocol address to reply with address resolution information in order to check the authenticity of said second unsolicited message submitting said spoofed address resolution for said network protocol address of said target computer station;

in response to receiving a reply message from said target computer station that matches said previously cached address resolution, said firewall determining that said second unsolicited message is a spoofed message and blocking at least one message which includes said spoofed address resolution from passing onto said host computer;

wherein said firewall is operable to protect said host computer from spoofed address resolution messages while permitting genuine address resolutions.

2. The method of claim 1, wherein said network elements reside in a LAN network running Internet Protocol Version 4 (IPv4) using the Address Resolution Protocol (ARP) for resolving medium access control (MAC) addresses, and said address resolution cache is an ARP cache mapping IPv4 addresses to MAC addresses.

3. The method of claim 1, wherein said network elements reside in a network that implements Internet Protocol Version 6 (IPv6) with Neighbor Discovery for resolving MAC addresses, and said address resolution cache is a Neighbor Discovery cache for mapping IPv6 addresses to MAC addresses.

4. The method of claim 1, wherein said firewall maintains a shadow copy of said address resolution cache, wherein said shadow copy is used as the source of said cached address resolution information.

5. The method of claim 4, wherein said maintaining said shadow copy comprises: storing cache entries with a residency lifetime greater than in said address resolution cache of said host computer.

6. A firewall stored on a machine readable medium for preventing spoofing of an address resolution cache of a host computer, said firewall comprising:

a state machine in said firewall configured to check independently cached address resolution information in response to receiving a first unsolicited address resolution response message from a target computer station directed to said host computer including a submitted genuine address resolution for a network protocol address;

said state machine generating a request for network elements to report an address resolution for said network protocol address in response to determining that said genuine address resolution of said first unsolicited message differs from a previously cached address resolution for said network protocol address in order to check the authenticity of said first unsolicited address resolution message submitting said submitted genuine address resolution for said network protocol address;

said state machine permitting an update of said independently cached address resolution information to include said submitted genuine address resolution in response to determining that no address resolution reply messages have said previously cached address resolution for said network protocol address that would contradict said submitted genuine address resolution of said first unsolicited message;

said state machine configured to check said independently cached address resolution information in response to receiving a second unsolicited address resolution response message from a spoofer including a submitted spoofed address resolution for said network protocol address of said target computer station;

said state machine generating a request for network elements to report an address resolution for said network protocol address in response to determining that said submitted spoofed address resolution of said second unsolicited message differs from a previously cached address resolution for said network protocol address in order to check the authenticity of said second unsolicited address resolution message submitting said submitted spoofed address resolution for said network protocol address; and said state machine blocking an update of said independently cached address resolution information of said address resolution cache of said host computer to include said submitted spoofed address resolution for said network protocol address in response to determining a reply message has said previously cached address resolution in contradiction to said submitted spoofed address resolution of said second unsolicited message;

wherein said state machine in said firewall protects said host computer from spoofed address resolution messages while permitting genuine address resolutions.

7. The firewall of claim 6, further comprising: a shadow copy of said address resolution cache, wherein said state machine is configured to check said shadow copy for cached address resolution information.

8. The firewall of claim 7, wherein cache entries in said shadow copy have a residency lifetime greater than corresponding entries of said address resolution cache.

9. The firewall of claim 6, wherein said address resolution cache is an ARP cache.

10. The firewall of claim 6, wherein said address resolution cache is a Neighbor Discovery cache.

11. The firewall of claim 6, wherein the firewall is resident on a chipset associated with a host computer.

12. The method of claim 1, wherein the firewall is resident on a chipset associated with the host computer.

13. The method of claim 1, wherein said cached address resolution information has an extended cache residency lifetime selected to support detection of spoofing attacks.

14. The firewall of claim 6, wherein said cached address resolution information is stored in a cache having an extended cache residency lifetime selected to support detection of spoofing attacks.

* * * * *